(12) United States Patent
Ying et al.

(10) Patent No.: US 7,176,985 B2
(45) Date of Patent: Feb. 13, 2007

(54) CLAMPING CIRCUIT FOR VIDEO SIGNALS

(75) Inventors: Feng Ying, Plano, TX (US); Erkan Bilhan, Dallas, TX (US); Haydar Bilhan, Dallas, TX (US); James E. Nave, Denton, TX (US)

(73) Assignee: Texas Instruments Incorporated, Dallas, TX (US)

( * ) Notice: Subject to any disclaimer, the term of this patent is extended or adjusted under 35 U.S.C. 154(b) by 496 days.

(21) Appl. No.: 10/457,654

(22) Filed: Jun. 9, 2003

(65) Prior Publication Data

US 2004/0246380 A1 Dec. 9, 2004

(51) Int. Cl.
H04N 5/18 (2006.01)
H04N 5/16 (2006.01)

(52) U.S. Cl. ............... 348/691; 348/689; 348/694; 348/673; 348/677

(58) Field of Classification Search ........... 348/691, 348/689, 692, 690, 673, 674, 677, 257, 694
See application file for complete search history.

(56) References Cited

U.S. PATENT DOCUMENTS

| | | | | |
|---|---|---|---|---|
| 4,237,489 A | * | 12/1980 | Kresock | 348/689 |
| 5,410,366 A | * | 4/1995 | Hostetler | 348/695 |
| 5,760,844 A | * | 6/1998 | Jorden | 348/691 |
| 5,798,802 A | * | 8/1998 | Elmis et al. | 348/689 |
| 5,875,002 A | * | 2/1999 | Nishiyama | 348/691 |
| 5,892,555 A | * | 4/1999 | Sohn | 348/689 |
| 5,940,058 A | * | 8/1999 | Koyama | 345/89 |
| 5,995,166 A | * | 11/1999 | Kawano | 348/691 |
| 6,204,892 B1 | * | 3/2001 | Kawano | 348/691 |
| 6,219,107 B1 | * | 4/2001 | Renner et al. | 348/678 |
| 6,400,412 B1 | * | 6/2002 | Suzuki | 348/572 |
| 6,529,248 B1 | * | 3/2003 | Tsyrganovich | 348/691 |
| 6,580,465 B1 | * | 6/2003 | Sato | 348/689 |
| 6,956,621 B2 | * | 10/2005 | Movshovish et al. | 348/691 |

* cited by examiner

Primary Examiner—David Ometz
Assistant Examiner—Jean W. Desir
(74) Attorney, Agent, or Firm—W. James Brady, III; Frederick J. Telecky, Jr.

(57) ABSTRACT

An apparatus, system and method for clamping a video signal input to a coupling capacitor (215) for providing a clamping voltage. A charging current is applied to the capacitor (215) via an amplifier (225) having a first input (227) coupled with the capacitor output and a second input (226) coupled to a reference potential, the amplifier (225) is responsive to the capacitor output signal and the reference potential for providing the charging current to the capacitor (215). The current has a linearly varying magnitude which is proportional to a difference between the capacitor output and the reference potential.

17 Claims, 3 Drawing Sheets

CLAMPING CIRCUIT FOR VIDEO SIGNALS

FIELD OF THE INVENTION

The present invention relates to restore circuits and, more particularly, to a clamping circuit for video signals.

BACKGROUND OF THE INVENTION

Conventional video signals comprise a time varying component which conveys image structure information referenced to a dc value which establishes the relative brightness of the scene. During transmission of the video signals, the dc reference value may be lost, thus it becomes necessary to reestablish the reference for output to a decoding device, for example. More specifically, as the black and white luma level in the video signal changes, the average picture level varies causing the entire waveform to shift up and down. That is, changes in the average picture level changes the average dc offset of the video waveform. More white in the picture moves the blanking level lower while more black moves the blanking level higher. The changing dc offset in the incoming video signal makes it difficult to read the luma and chroma references and, therefore, makes it more complicated to decode the video information.

Generally, there are two categories of video clamping circuits. For one, clamping is activated during predefined time period of every line usually during blanking (backporch) or horizontal sync which disadvantageously requires a timing signal and/or a circuit generating the timing signal is required. Another category of video clamping circuits uses a comparator circuit with a control loop for automatic clamping and does not need the above-mentioned timing signal, however, due to characteristics of the comparator circuit the control loop is not linear. Though this category of video clamping circuits does not require a timing signal, the stability of this circuit is difficult to design and can be sensitive to external parameter change such as output impedance of the video source.

SUMMARY

The present invention achieves technical advantages as a circuit and system for clamping the lowest level of a video signal or sync tip to a reference voltage. The system includes a semi-linear transconductance device with an output such that when the video signal is lower than a reference voltage the output current is proportional to the voltage difference between the video signal and the reference voltage, and when the video signal is higher than the reference voltage the output current is zero. Thus, the system is linear when clamping is active and zero when clamping is not active.

BRIEF DESCRIPTION OF THE DRAWINGS

For a more complete understanding of the present invention, reference is made to the following detailed description taken in conjunction with the accompanying drawings wherein.

DETAILED DESCRIPTION

Figure 1:
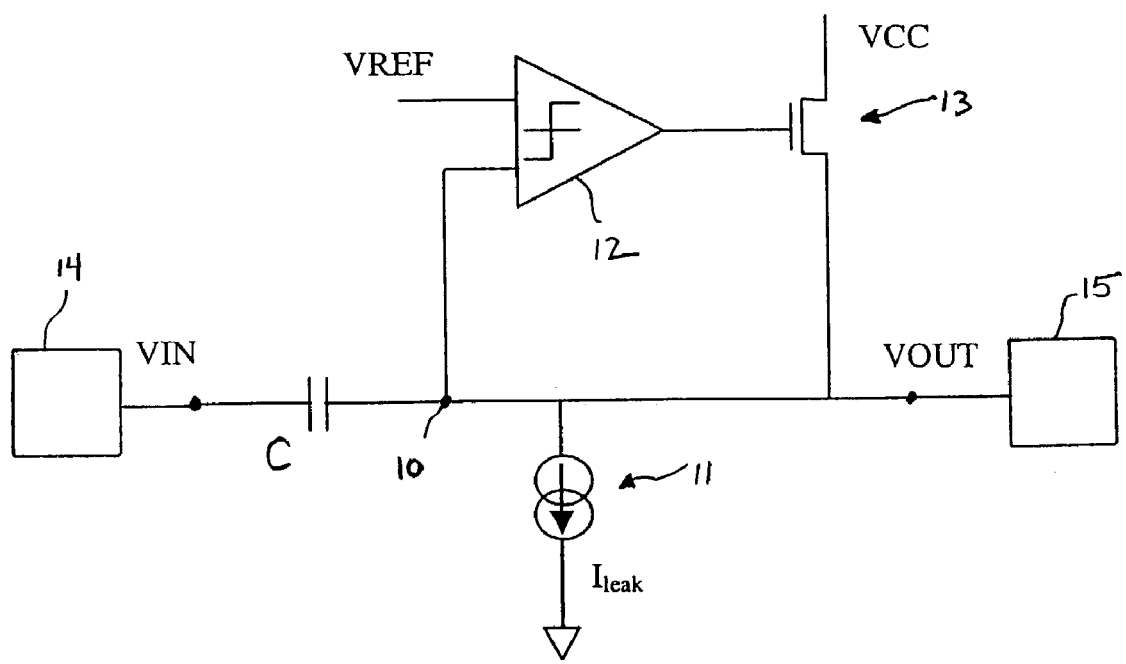
FIG. 1 illustrates a conventional comparator control loop video clamping circuit.

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others. Throughout the drawings, it is noted that the same reference numerals or letters will be used to designate like or equivalent elements having the same function. Detailed descriptions of known functions and constructions unnecessarily obscuring the subject matter of the present invention have been omitted for clarity.

Referring to FIG. 1 there is illustrated a conventional comparator control loop video clamping circuit in which a video signal from a video device 14 is applied to a coupling capacitor C of the clamping circuit. The output node 10 of the capacitor C provides the dc restored or clamped video output signal which is the input for a decoder 15. A current source 11 is further coupled to node 10 and sinks current from the capacitor C tending to prevent lock up at some erroneous dc value. The signal from node 10 is coupled to the non-inverting input terminal of a comparator 12. A reference potential is applied to an inverting input terminal of the comparator 12. The comparator 12 generates a bi-level output signal which is relatively positive when the amplitude of the signal is greater than the reference voltage and relatively negative when the reference voltage is greater than the amplitude of the signal. The reference voltage is selected to equal the dc potential value to which the synchronizing pulses of the video output signal are to be clamped.

The output of the comparator 12 is coupled to the gate of transistor 13 and the drain of transistor 13 is coupled to node 10 forming a current source for selectively supplying current to node 10. During pulse intervals, the amplitude of the video signal at node 10 is typically less than the reference voltage due to the constant discharge of capacitor C by current source 11. As such, comparator 12 provides a relatively negative output signal which turns ON transistor 13 to charge capacitor C to the reference voltage, so the lowest level of the output signal, sync tip, is clamped to the reference voltage. When node 10 reaches the reference voltage or the end of the synchronizing period occurs in which case the video signal goes relatively positive, the output signal of comparator 12 becomes relatively positive turning OFF transistor 13. The non-linearity of the control loop due to the above-described ON/OFF switching feature, creates design difficulties.

Figure 2:
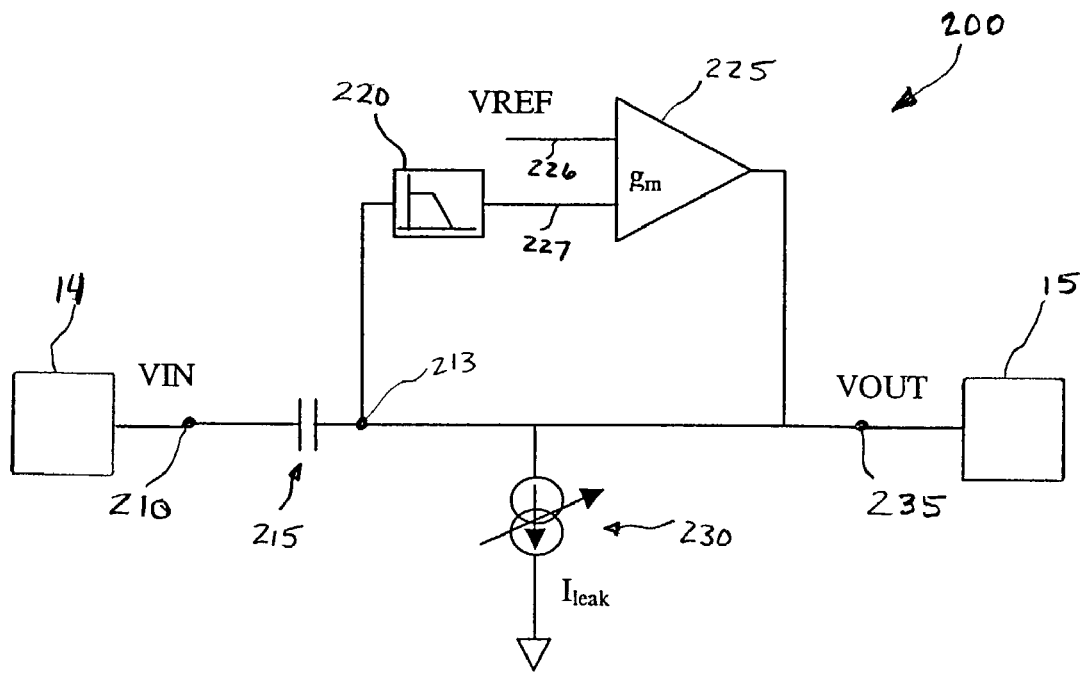
FIG. 2 illustrates a clamping circuit in accordance with exemplary embodiments of the present invention.
Figure 3:
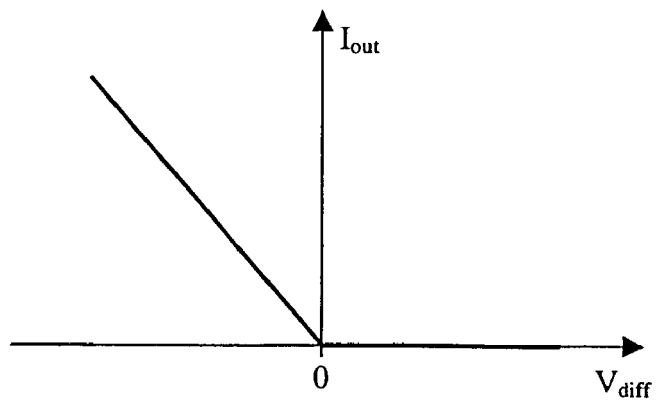
FIG. 3 illustrates the transfer function of the amplifier shown in FIG. 2.

Referring now to FIG. 2 there is illustrated a clamping circuit 200 in accordance with exemplary embodiments of the present invention. A video signal from the video device 14 is applied at input 210 which is couple to a capacitor 215 having an output node 213. Capacitor 215 provides a dc clamped signal $V_{OUT}$ to output 235. Output 235 is coupled with a decoder 15 for decoding the output signal. Node 213 is further coupled to an input 227 of an semi-linear transconductance amplifier 225 with the other input 226 connected to a reference voltage $V_{REF}$. The amplifier 225 can be an always-ON amplifier to prevent having extra timing signaling. The output of amplifier 225 is connected back to node 213 forming a control loop. The always-ON semi-linear transconductance amplifier control loop clamps the lowest level of the video signal or the sync tip to the reference voltage $V_{REF}$. The transfer function of the amplifier 225 according to exemplary embodiments of the present invention is shown in FIG. 3 in which the current output of the amplifier is shown as $I_{OUT}$ and the difference between the video signal and $V_{REF}$ is shown as $V_{diff}$. In operation, when the video signal is lower than $V_{REF}$, the output current of amplifier 225 is proportional to the voltage difference in the video signal and $V_{REF}$. When the video signal is equal to or higher than the $V_{REF}$, the output current is zero. Thus, the control loop is either linear or open. In the active clamping range, the control loop is linear and can be analyzed with linear control design.

A current sink 230 is further coupled at node 213 providing a small leakage current (1 μA for example) for the capacitor 215 to a ground reference for low frequency noise rejection. The current sink 230 can be configured to be programmable for providing a variable leakage current to accommodate different levels of low-frequency noise rejection. The range of the leakage current and the number of control steps are decided by requirements on low-frequency noise rejection.

A low-pass filter 220 can be included in the control loop between node 213 and the corresponding amplifier input 227 for rejecting high-frequency noise. Because the system is linear when clamping is active, the system is robust and easier to design even with the filter 220 added.

Figure 4:
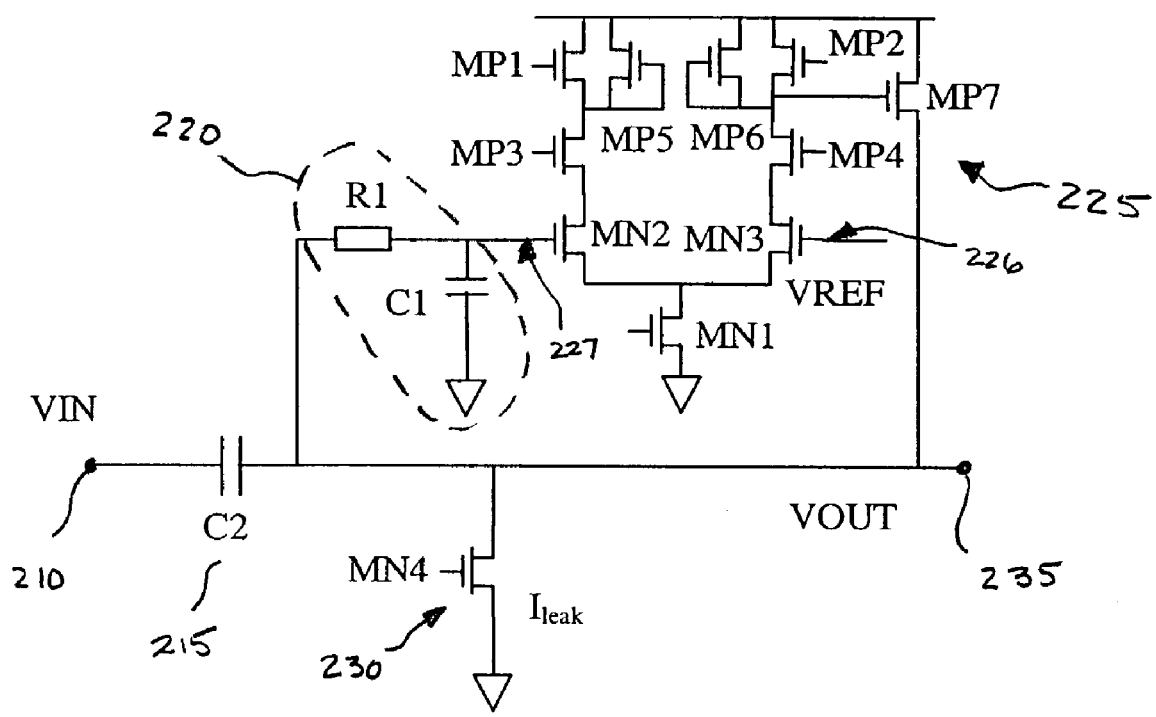
FIG. 4 illustrates a CMOS implementation of the clamping circuit shown in FIG. 2 according to exemplary embodiments of the present invention.

Referring now to FIG. 4 there is illustrated a CMOS implementation of the clamping circuit shown in FIG. 2 in which p-type devices are designated MP and n-type devices are designated MN. The semi-linear transconductance amplifier 225 is comprised of transistor MP1-7 and MN1-3.

Transistors are biased such that when input transistors MN2 and MN3 have the same gate voltage (i.e., the input signal is equal to $V_{REF}$), the current through MN1 is the same as the sum of currents through MP1 and MP2 such that Vdiff=0 and Iout=0.

When the gate voltage of MN2 is higher than the gate voltage of MN3 (i.e., the input signal is higher than $V_{REF}$), there is no current conduction through MP6 or MP7.

When the gate voltage of MN2 is lower than the gate voltage of MN3 (i.e., the input signal is lower than $V_{REF}$), a current proportional to the voltage difference is conducted through MP6 and MP7.

The current sink 230 includes transistor MN4 in which a programmable amount of leakage current is conducted through MN4 when $V_{OUT}$ is higher than ground. The leakage current sets the steady-state operating point. At steady state, the amplifier current equals to the leakage current. A small leakage current makes sure the amplifier works near Vdiff=0.

The low pass filter 220 comprising a series resistor R1 and a shunt capacitor C1. This low pass filter 220 is configured to pass the horizontal synchronizing pulses and to attenuate noise and the higher frequency components of the active video signal. The signal of the low pass filter 220 is coupled with the amplifier input 227 (i.e., the gate of MN2).

The present invention is above-described in terms of conventional video signals including horizontal synchronizing components, however it should be appreciated that it is applicable to any signals having pulsed intervals in which the amplitude bears some relationship to the DC reference value of the signal.

Although exemplary embodiments of the invention are described above in detail, this does not limit the scope of the invention, which can be practiced in a variety of embodiments.

What is claimed is:

1. An apparatus for clamping a video signal comprising:
   a capacitive device having an input for receiving said video signal and an output for providing a modified video signal; and
   an amplifier having a first input coupled with said capacitive output and a second input coupled to a reference potential, said amplifier responsive to said capacitive output signal and said reference potential for providing a current to said capacitive output for modifying said video signal when a potential of said video signal is lower than a potential of said reference;
   said current having a magnitude which is proportional to a difference between said capacitive output signal and said reference potential when said difference is negative and which is zero when said difference is positive.

2. The apparatus of claim 1, wherein said current magnitude increases linearly with an increased difference between said capacitive output signal and said reference potential increases.

3. The apparatus of claim 1, wherein said current is cooperable with said capacitive device for providing a potential on said capacitive output related to said reference potential.

4. The apparatus of claim 1, wherein said current is cooperable with said capacitive device for providing said video signal with an increased potential when a potential thereof is less than said reference potential.

5. The apparatus of claim 1 further including a low pass filter coupled between said capacitive device and said amplifier first input for providing rejection of predetermined frequency components of said video signal.

6. The apparatus of claim 5, wherein said low pass filter includes a series coupled resistance and a shunt coupled capacitance.

7. The apparatus of claim 1 further including a programmable current device coupled to said capacitive output for sinking a selective current from said capacitive device.

8. The apparatus of claim 7, wherein said current device includes a transistor coupled in series between said capacitive output and a ground reference, wherein a control electrode of said transistor is selectively biased for providing a conduction path from said capacitive output to said ground reference through said transistor.

9. The apparatus of claim 1, wherein said amplifier is an always-ON semi-linear transconductance transistor amplifier.

10. A system for processing a video signal, comprising:
    a circuit for clamping said video signal, comprising:
    a capacitive device having an input for receiving said video signal and an output for providing an output signal corresponding to said video signal; and
    an amplifier having a first input coupled with said capacitive output and a second input coupled to a reference potential, said amplifier responsive to said capacitive output signal and said reference potential for providing a current to said capacitive output for modifying said video signal when a potential of said video signal is lower than a potential of said reference, said current having a magnitude which is proportional to a difference between said capacitive output signal and said reference potential when said difference is negative and which is zero when said difference is positive; and
    a decoder having an input for receiving said modified video signal and responsive thereto for decoding said modified composite signal.

11. The system of claim 10, wherein said current magnitude increases linearly with an increased difference between said capacitive output signal and said reference potential increases.

12. The apparatus of claim 10, wherein said current is cooperable with said capacitive device for providing said video signal with an increased potential when a potential thereof is less than said reference potential.

13. The apparatus of claim 10 further including a low pass filter couple between said capacitive device and said amplifier first input for providing rejection of predetermined frequency components of said video signal, said low pass filter including a series coupled resistance and a shunt coupled capacitance.

14. The apparatus of claim 10 further including a programmable current device coupled to said capacitive output for sinking a selective current from said capacitive device, said current device including a transistor coupled in series between said capacitive output and a ground reference, wherein a control electrode of said transistor is selectively biased for providing a conduction path from said capacitive output to said ground reference through said transistor.

15. The apparatus of claim 10, wherein said amplifier is an always-ON semi-linear transconductance transistor amplifier.

16. A method of clamping a video signal, comprising:
providing said video signal with a restore potential via a capacitive device, wherein said video signal is provided to an input of said capacitive device;
determining a difference between a potential corresponding to said video signal output at an output of said capacitive device and said restore potential;
charging said capacitive device with a current having a magnitude which is proportional to said difference when said video signal potential is less than said restore potential and which is zero when said video signal potential is greater than said restore potential for providing said video signal with an increased potential.

17. The method of claim 16 further including increasing said current magnitude linearly as the difference between a lesser video signal potential and said restore potential increases.

* * * * *